United States Patent
Gaertner et al.

(10) Patent No.: US 8,483,991 B2
(45) Date of Patent: Jul. 9, 2013

(54) METHOD AND SYSTEM FOR MEASURING THERMAL RADIATION TO DETERMINE TEMPERATURE AND EMISSIVITY OF AN OBJECT

(75) Inventors: Reno Gaertner, Berlin (DE); Steffen Ludwig, Berlin (DE); Rainer Kuepper, Berlin (DE); Klaus-Peter Moellmann, Berlin (DE)

(73) Assignee: Fluke Corporation, Everett, WA (US)

( * ) Notice: Subject to any disclaimer, the term of this patent is extended or adjusted under 35 U.S.C. 154(b) by 586 days.

(21) Appl. No.: 12/466,683

(22) Filed: May 15, 2009

(65) Prior Publication Data

US 2010/0292951 A1  Nov. 18, 2010

(51) Int. Cl.
*G01K 11/30* (2006.01)
(52) U.S. Cl.
USPC ............ 702/135; 702/130; 702/134; 374/9; 374/121; 374/130
(58) Field of Classification Search
USPC ............ 702/49, 116, 130, 134, 135; 374/9, 374/121, 130
See application file for complete search history.

(56) References Cited

U.S. PATENT DOCUMENTS

| | | | |
|---|---|---|---|
| 4,172,383 A * | 10/1979 | Iuchi | 374/9 |
| 4,577,105 A * | 3/1986 | Krempl et al. | 250/343 |
| 4,579,461 A * | 4/1986 | Rudolph | 374/9 |
| 4,647,775 A * | 3/1987 | Stein | 250/338.1 |
| 4,708,493 A * | 11/1987 | Stein | 374/128 |
| 6,217,695 B1 * | 4/2001 | Goldberg et al. | 156/244.17 |
| 6,422,745 B1 * | 7/2002 | Glasheen et al. | 374/131 |
| 7,119,337 B1 * | 10/2006 | Johnson et al. | 250/339.13 |
| 2002/0139790 A1 * | 10/2002 | Adams et al. | 219/390 |
| 2003/0220629 A1 * | 11/2003 | Bille et al. | 606/5 |
| 2007/0020784 A1 * | 1/2007 | Timans | 438/16 |
| 2007/0076780 A1 * | 4/2007 | Champetier | 374/121 |
| 2008/0218769 A1 * | 9/2008 | Ahn et al. | 356/614 |
| 2009/0004456 A1 * | 1/2009 | Reddy et al. | 428/304.4 |

* cited by examiner

*Primary Examiner* — Alexander H Taningco
*Assistant Examiner* — Paul D Lee
(74) *Attorney, Agent, or Firm* — Perkins Coie LLP (57) ABSTRACT

A system and method are disclosed that determines the emissivity and temperature of a target object. A compact emitter capable of sequentially emitting blackbody-like radiation at two different temperatures is used to determine the target object's emissivity and temperature.

21 Claims, 7 Drawing Sheets

$$S_{Pyr} = \varepsilon 0 \cdot S(T0) + (1-\varepsilon 0) \cdot \varepsilon 1 \cdot S(T1)$$

METHOD AND SYSTEM FOR MEASURING THERMAL RADIATION TO DETERMINE TEMPERATURE AND EMISSIVITY OF AN OBJECT

TECHNICAL FIELD

The present disclosure relates to pyrometers that determine the temperature and emissivity of an object.

BACKGROUND

Infrared radiation emitted by an object is dependent upon the object's temperature and emissivity. The temperature of the object can be calculated using Planck's law if the emissivity of the object is known at that temperature, and the radiation emitted from the object is measured. However, the emissivity of many materials can change depending upon many factors such as temperature, surface structure, surface roughness, and oxidation, to name a few. Thus, the accuracy of the determination of an object's temperature is only as good as the accuracy to which the emissivity of the object is known.

SUMMARY

A compact emitter that exhibits blackbody characteristics and can be set to different temperatures is used with an infrared detector to determine the emissivity and temperature of a target object. A first measurement of infrared radiation is made after the emitter radiates at a known first temperature onto a target object whose temperature and emissivity are to be determined, and a second measurement is made after the emitter radiates at a known second temperature onto the target object. Each radiation measurement includes the radiation emitted by the object and the radiation emitted by the emitter that is subsequently reflected by the object. These two measurements permit the emissivity of the target object to be determined using Kirchoff's Law and Planck's Law. Once the emissivity of the target object has been calculated, the temperature of the object can be determined using the Stefan-Boltzmann Law.

BRIEF DESCRIPTION OF THE DRAWINGS

Examples of a pyrometer system and method for measuring thermal radiation of an object to determine the object's temperature and emissivity are illustrated in the figures. The examples and figures are illustrative rather than limiting.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are described below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the disclosure. Certain terms may even be emphasized below; however, any terminology intended to be interpreted in any restricted manner will be overtly and specifically defined as such in this Detailed Description section.

According to Kirchhoff's law of thermal radiation, the emissivity of an opaque object is equal to one minus the reflectivity of the object. Further, according to Planck's law, the emitted radiation S of an object equals the emissivity of the object times the radiation emitted by a blackbody at the same temperature as the object in a certain, usually limited spectral range. The Stefan-Boltzmann law, $S = \epsilon \cdot \sigma \cdot T^4$, where $\epsilon$ is the emissivity, $\sigma$ is the Stefan-Boltzmann constant, and T is the temperature of the object, describes the relationship between temperature radiated by a black body and its emissivity for the whole spectral range (total radiation thermometer). All three laws together can be used to determine the emissivity and temperature of a target object.

Figure 1:
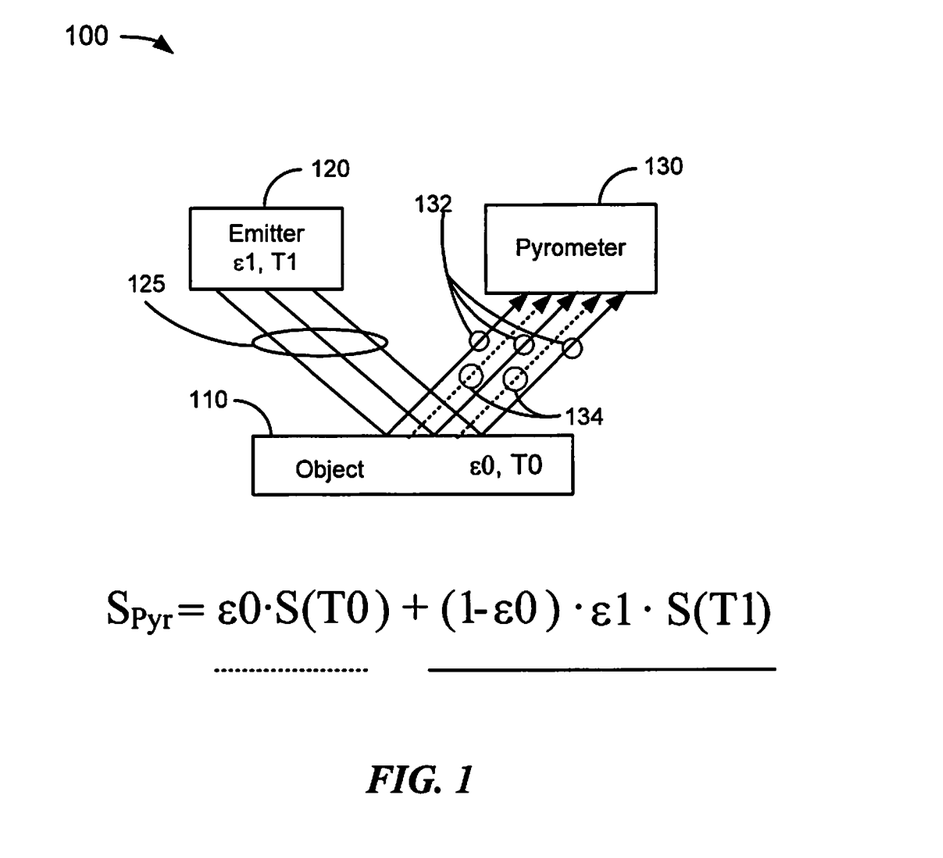
FIG. 1 shows a suitable system having a pyrometer and an emitter measuring radiation from a target object, according to an embodiment of the disclosure.

FIG. 1 shows a system 100 having a pyrometer that is used to measure the thermal radiation of an object. The target object 110 has an emissivity $\epsilon 0$ and temperature T0, both of which are unknown prior to the measurement. An emitter source 120 having a known emissivity $\epsilon 1$ and temperature T1 is used to illuminate the object 110 with known radiation S(T1). In one embodiment, the emitter source 120 is a blackbody or has blackbody characteristics.

A pyrometer 130 measures radiated thermal energy. The radiated energy detected by the pyrometer 130 is the sum of the energy radiated 134 by the object 110 and the energy from the emitter source 120 that is reflected 132 by the object 110. The energy radiated 134 by the object 110 is given by the product $\epsilon 0 \cdot S(T0)$, where $\epsilon 0$ is the object's emissivity, and $S(T0)$ is the radiation emitted by a blackbody having the object's temperature. The energy from the emitter source 120 that is reflected 132 from the object 110 is given by the product $(1-\epsilon 0) \cdot \epsilon 1 \cdot S(T1)$, where $(1-\epsilon 0)$ is the reflectivity of the object, $\epsilon 1$ is the emitter source's emissivity, and $S(T1)$ is the radiation emitted by a blackbody having the emitter source's temperature. Thus, the radiated energy measured by the pyrometer is given by $$Spyr = \epsilon 0 \cdot S(T0) + (1-\epsilon 0) \cdot \epsilon 1 \cdot S(T1). \quad (1)$$

If the emissivity $\epsilon 0$ of the object 110 were known, equation (1) could be used in conjunction with the Stefan-Boltzmann law to determine the temperature T0 of the object 110. However, if the target object 110 has a varying or unknown emissivity, there is not enough information to determine the object's temperature T0.

Figure 2:
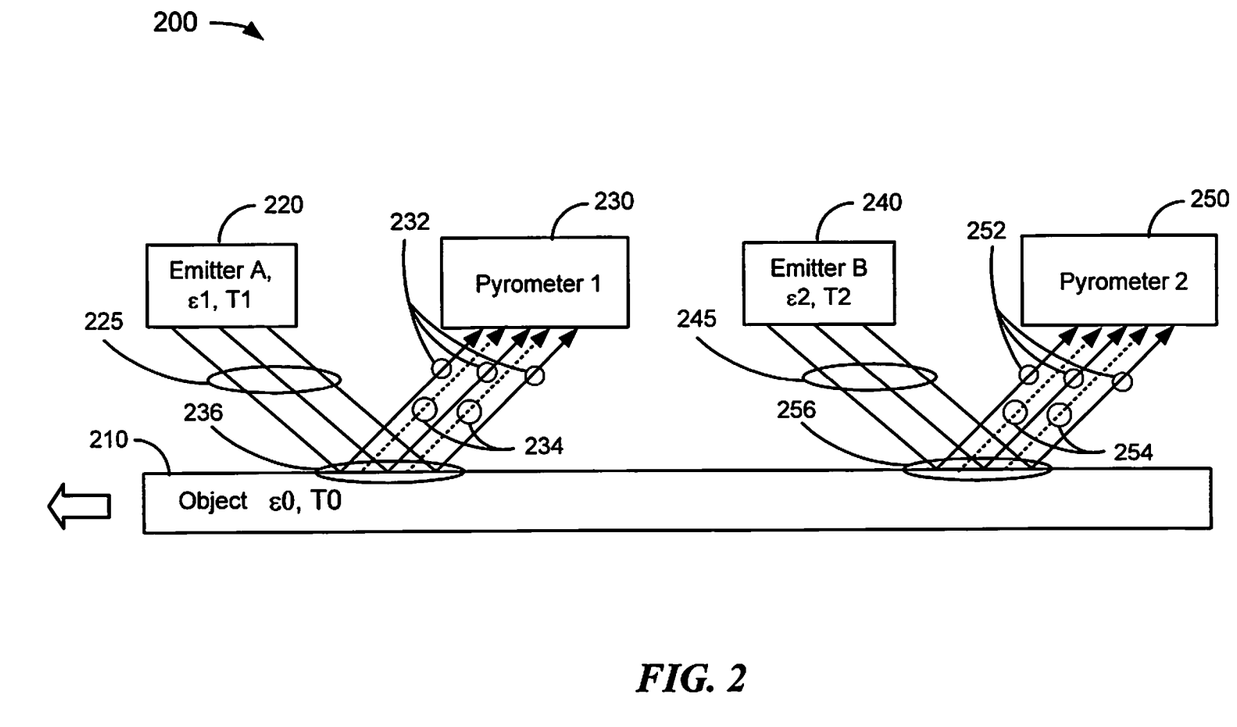
FIG. 2 shows a suitable system having two emitters and two pyrometers used to measure the emissivity and temperature of a target object, according to an embodiment of the disclosure.

In one embodiment as shown in FIG. 2, a system 200 uses two pyrometers and two emitters to determine the temperature of an object without knowing the emissivity of the object prior to the measurement. As above, the object 210 to be measured has an unknown emissivity $\epsilon 0$ and an unknown temperature T0. Emitter A 220 has a known emissivity $\epsilon 1$, a known temperature T1, and emits a known amount of radiation $S(T1)$. Similarly, the emitter B 240 has a known emissivity $\epsilon 2$, a known temperature T2, and emits a known amount of radiation $S(T2)$. The temperatures T1 and T2 of the emitters 220, 240 are different. Pyrometer 1 230 measures S1, the sum of the energy radiated 234 by the object 210 and the energy from the emitter A 220 that is reflected 232 by the object 210. Likewise, pyrometer 2 250 measures S2, the sum of the energy radiated 254 by the object 210 and the energy from the emitter B 240 that is reflected 252 by the object 210. Then using Planck's Law and Kirchhoff's Law, the following two equations are obtained:

$$S1 = \epsilon 0 \cdot S(T0) + (1-\epsilon 0) \cdot \epsilon 1 \cdot S(T1) \quad (2)$$

$$S2 = \epsilon 0 \cdot S(T0) + (1-\epsilon 0) \cdot \epsilon 2 \cdot S(T2), \quad (3)$$

where $S(T0)$ is the radiation emitted by a blackbody having the same temperature T0 as the object to be measured. Equations (2) and (3) can be used to determine the two unknowns, $\epsilon 0$ and T0. If the two emitters 220, 240 are blackbody emitters such that their emissivities are equal or approximately equal to one, equations (2) and (3) can be solved for $S(T0)$ and $\epsilon 0$:

$$S(T0) = \frac{S2 \cdot S(T2) - S1 \cdot S(T1)}{S2 - S1 + S(T1) - S(T2)} \quad (4)$$

$$\varepsilon 0 = 1 - \frac{S2 - S1}{S(T1) - S(T2)}. \quad (5)$$

If non-blackbody emitters having emissivities that are not approximately equal to one are used, slightly more complex equations will result from solving equations (2) and (3) for $\epsilon 0$ and T0.

Because the emissivity of an object is highly dependent upon many factors including, but not limited to, temperature, humidity, oxidation, and surface structure, the measurements made with the pyrometers 230, 250 should be made on or near the same spot of the object 210. In the configuration shown in FIG. 2, pyrometer 1 230 measures the spot 236, while pyrometer 2 240 measures the spot 256. Thus, to overcome differences in emissivity at different spots on the object 210, the object 210 can be moved, and the pyrometers can measure the same spot sequentially.

Figure 3:
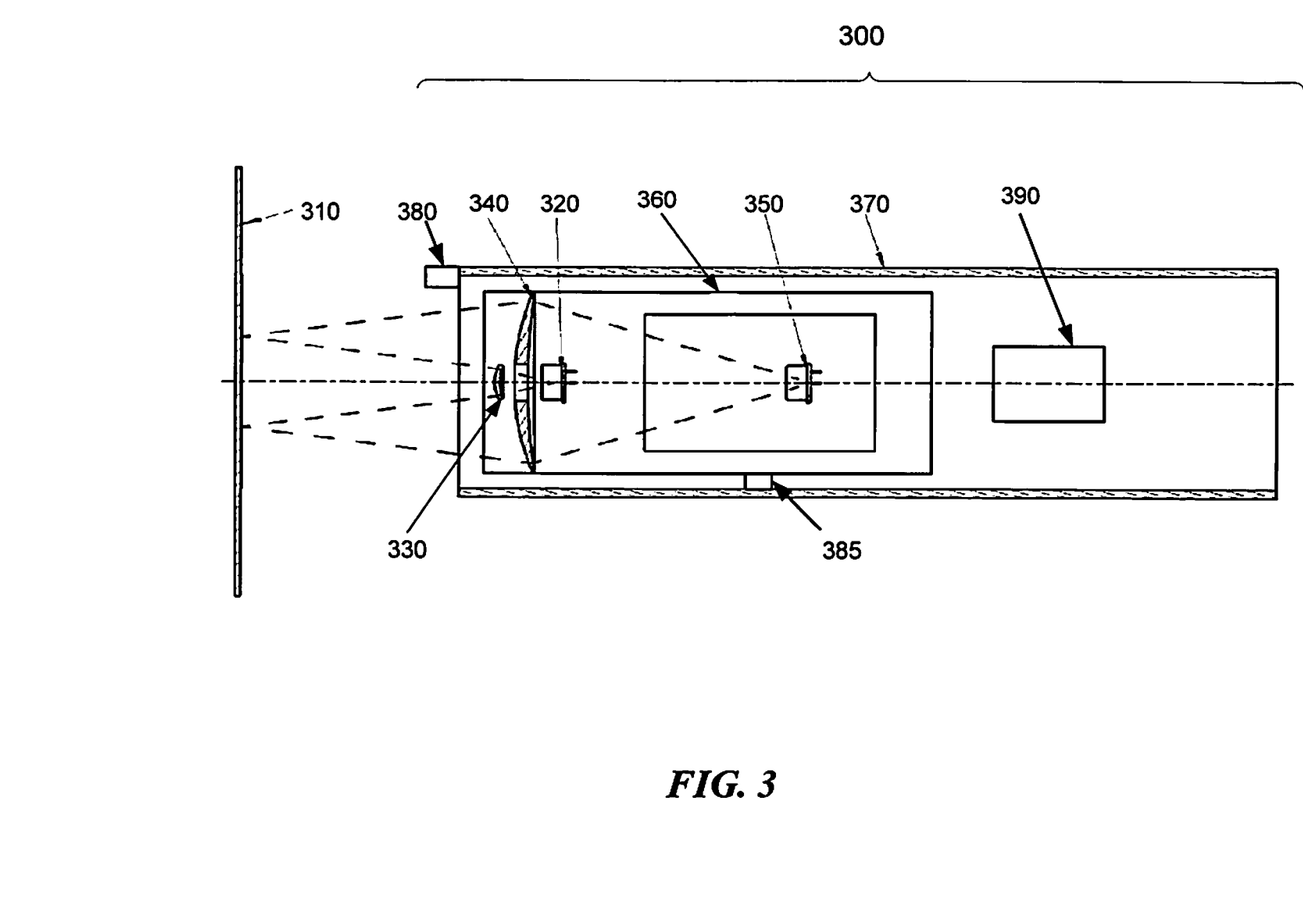
FIG. 3 shows an example block diagram of a pyrometer, according to an embodiment of the disclosure.

FIG. 3 shows a pyrometer system 300 in which a single emitter and a single detector can be used to determine the emissivity and temperature of a stationary object. The temperature and emissivity of the object 310 are to be measured.

A blackbody emitter or an emitter 320 that has nearly blackbody characteristics with a known emissivity is used to illuminate the object 310. The emitter 320 is capable of emitting at least two different temperatures sequentially. In a preferred embodiment, the emitter 320 is compact such that the pyrometer system 300 can be miniaturized.

In one embodiment, infrared radiation emitted by the emitter 320 passes through a hole in the center of infrared lens 340. In one embodiment, the emitter 320 can be located within the hole in the center of the infrared lens 340.

The infrared lens 330 is used to focus and project the radiation from the emitter 320 onto the surface of the target object 310 such that the illumination of the emitter 320 onto the target object 310 is equal in size to or within the measuring spot of the detector 350. Radiation emitted by the object 310 and radiation from the emitter 320 and reflected by the object 310 is then projected by the lens 340 onto the field aperture of an infrared detector 350. The dotted lines in FIG. 3 is a simplified ray trace of the radiation from the emitter 320 and object 310 that gets projected by the infrared lenses 330, 340. The infrared lenses 330, 340 can be made from a material that can focus infrared radiation, such as silicon.

The emitter 320 should be capable of emitting infrared radiation at least two different temperatures at different times. Using an emitter 320 that is capable of emitting at different temperatures is advantageous because the pyrometer is not as large as a system that uses two separate emitters, and a single spot on the target object can be measured without requiring coordination of an object's movement with the radiation measurements to ensure that the same spot is measured on the object with two different emitters and pyrometers at two separate locations.

In one embodiment, the emitter 320 should emit radiation at long wavelengths between approximately 8 and 14 microns. Shorter wavelengths may not be suitable because very low energy levels may be measured with the pyrometer. Longer wavelengths may not be suitable because infrared detectors may not be readily available at these wavelengths.

In one embodiment, the emitter 320 can switch between the two different temperatures relatively quickly such that pulses of energy at the two different temperatures are emitted sequentially. One non-limiting example of an emitter having these characteristics is the electrically modulated infrared source EMIRS200 manufactured by Leister Microsystems of Sarnen, Switzerland. The EMIRS200 exhibits blackbody characteristics with a very high emissivity. It directly modulates the electrical input signal and has a low thermal mass to permit heating and cooling of the emitting microfilament with very short time constants of 11 ms and 17 ms, respectively.

The detector 350 should be capable of detecting the infrared wavelengths emitted by the emitter 320. The time constant of the detector 350 should be comparable to the time constant of the emitter 320. One non-limiting example of a detector is the miniaturized thermal radiation sensor TS-80 manufactured by The Institute for Photonic Technology (IPHT) of Jena, Germany. The TS-80 sensor is a miniaturized multi-junction thermopile made by microsystems technology on silicon wafers.

The signals generated by the detector 350 can be subsequently electronically amplified, filtered, and converted into digital signal levels by electronics 390. The electronics 390 also includes a microcontroller that converts the energy data to temperature. In one embodiment, the microcontroller uses a look-up table to convert the energy to temperature.

In one embodiment, a sensor 380 coupled to the front end of the instrument housing 370 continuously measures the distance between the front end of the instrument and the surface of the target object 310. The distance information can be used to control both the power of the emitter 320 and a tilt mechanism 385. The tilt mechanism 385 holds and mechanically connects the opto-mechanical support structure 360 with the housing 370 of the instrument to maintain the optical axis of the optical components 320, 330, 340, 350. The tilt mechanism 385 in conjunction with the distance measurement made by the sensor 380 maintains a 90° angle between the instrument's optical axis and the surface of the object 310. An electrical circuit in the electronics 390 captures the signal from the distance measurement sensor 380 and provides means to control and drive a dedicated electro-mechanical component (not shown), such as a gear motor assembly.

Figure 4:
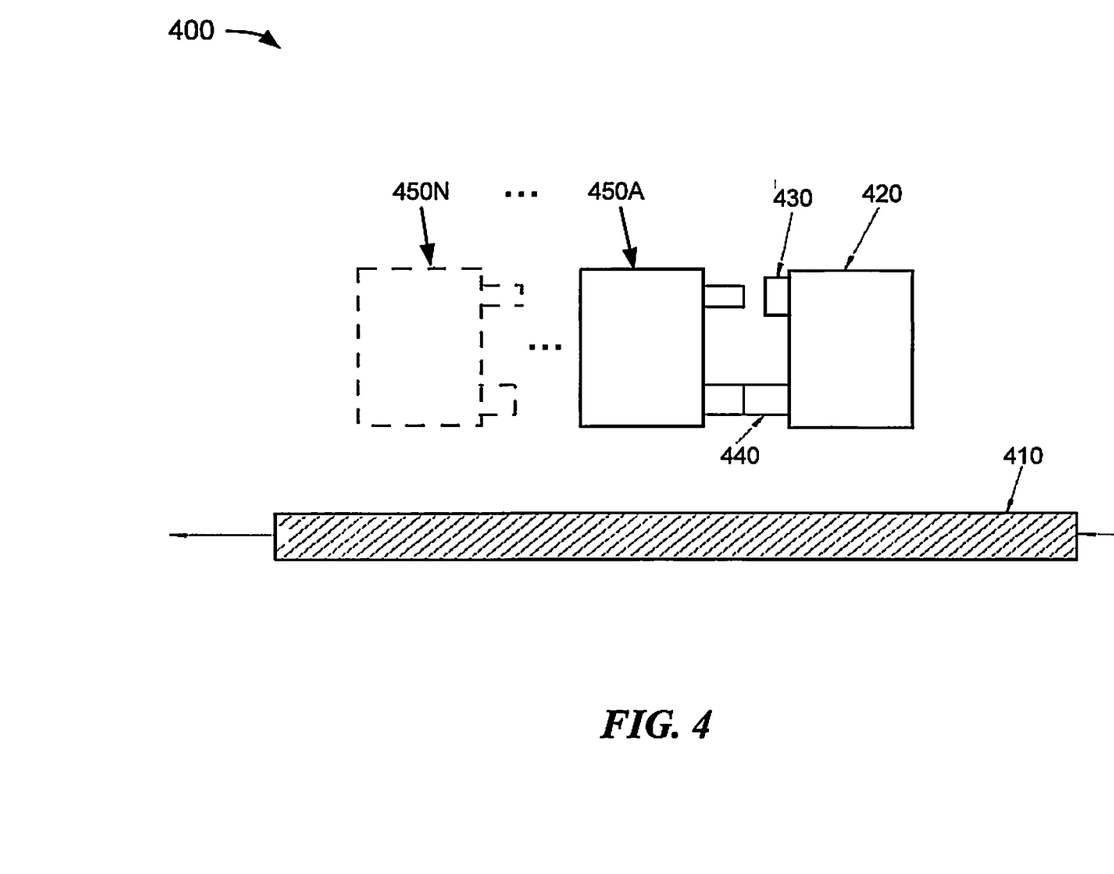
FIG. 4 shows an example system diagram of a slave unit coupled to a master unit used to measure the temperature of a moving object, according to an embodiment of the disclosure.

In one embodiment, the object to be measured can be moving rapidly, for example during a manufacturing process. In this case, a slave unit can be installed and coupled to the master unit to measure the temperature and emissivity of the object. FIG. 4 shows a pyrometer measurement system for measuring a moving object 410 having a master unit 420 and one or more slave units 450A-N coupled to the master unit 420. For simplicity of the following discussion, only one slave unit will be referenced, however multiple slave units would work in a similar manner. Both the master unit 420 and the slave unit 450A have the elements shown in the block diagram of FIG. 3, a detector, an emitter, a lens to project the radiation emitted by the emitter onto the object, and another lens to project the emitter radiation reflected by the object and radiation emitted by the object onto a field aperture of the detector, and electronics for processing signals from the detector. The only difference is that the emitter for both the master unit 420 and the slave unit 450A do not have to be able to emit at multiple temperatures. Each unit can just emit at one constant temperature, as long as the temperature emitted by the units is different. The slave unit 450A can be installed and coupled to the master unit 420 through a mechanical connector 440 and a combined mechanical/electrical connector 430.

In the figure, the object 410 is moving toward the left past the master unit 420 and the slave unit 450A. As the object 410 moves past the master unit 420, the emitter in the master unit emits at a first temperature and illuminates a trace along the object 410, and the detector in the master unit senses radiation from along the same trace of the object 410. Likewise, as the object 410 moves past the slave unit 450A, the emitter in the slave unit emits at a second temperature and illuminates a second trace along the object 410, and the detector in the slave unit senses radiation along the second trace of the object 410. The master unit 420 and the slave unit 450A emit continuously at their respective temperatures without alternating to another temperature. Data from the slave unit's 450A detector is pre-processed in the slave unit and fed to the master unit 420. The data from the slave unit 450A and the master unit 420 are correlated and a final temperature and/or emissivity is calculated for the measured object 410.

In some applications, a process control unit (not shown) in the manufacturing process determines the speed of the object 410, and the master unit 420 provides a means to capture the speed signal from the process control unit (not shown). If the speed of the object is sufficiently rapid compared to the time it takes to take a measurement (both master and slave), the first trace illuminated and detected by the master unit 420 and the second trace illuminated and detected by the slave unit 450A may overlap. The combined master-slave units integrate their signals over the same overlapping trace along the object 410, so that the conditions for measuring $\epsilon 0$ and $S(T0)$ are nearly the same for both measurements. The integration time is dependent upon the response time of the detectors in the master and slave units because each detector has a finite time constant and needs some time to warm up its active area while the object is moving through the detector's field of view. For example, measurements can be taken at approximately one time constant (corresponding to approximately 60% energy levels) or approximately three time constants (corresponding to approximately 95% energy levels).

Figure 5:
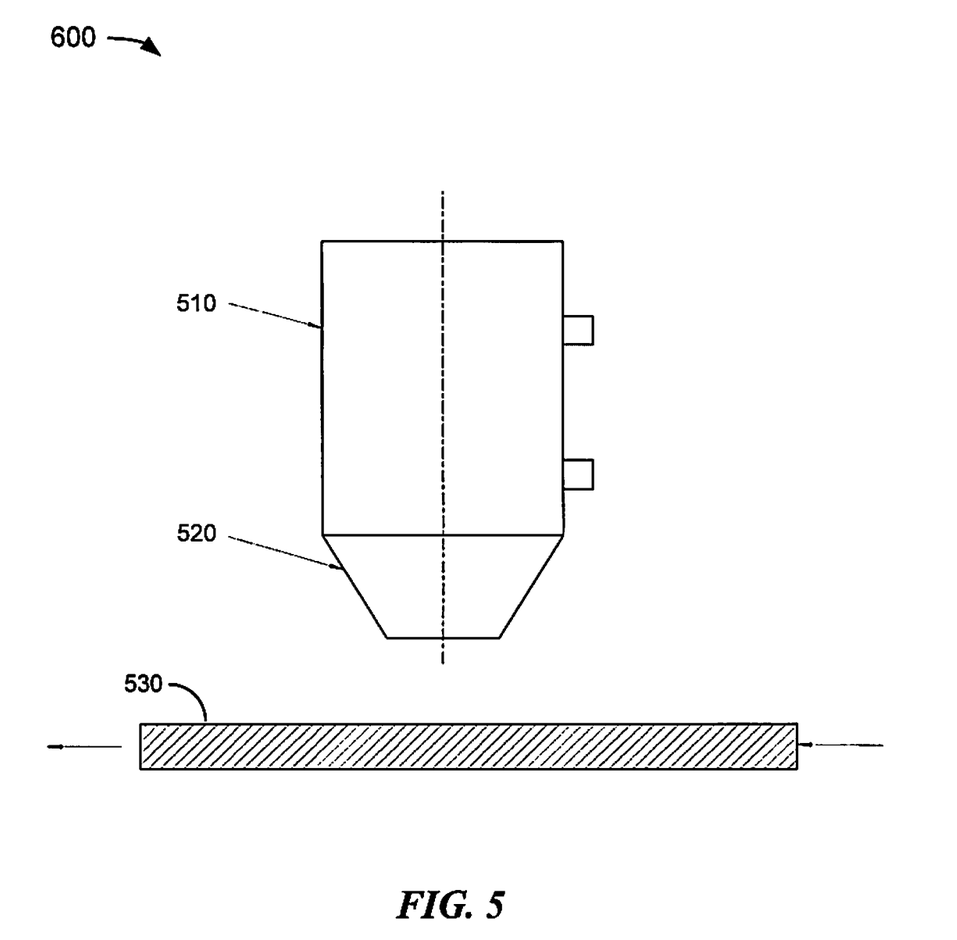
FIG. 5 shows an example block diagram of a pyrometer system in a housing with thermal insulation, according to an embodiment of the disclosure.

In one embodiment, the pyrometer system can be in a housing with thermal insulation. FIG. 5 shows that the instrument housing 510 of the pyrometer can be connected to a water-cooled attachment 520 to protect the instruments inside the housing 510 should the instruments be exposed to target objects 530 that have high temperatures. Additionally or alternatively, the water-cooled attachment 520 can provide shielding of the instruments against stray radiation. In one embodiment, the water-cooled attachment 520 is cone-shaped.

Figure 6:
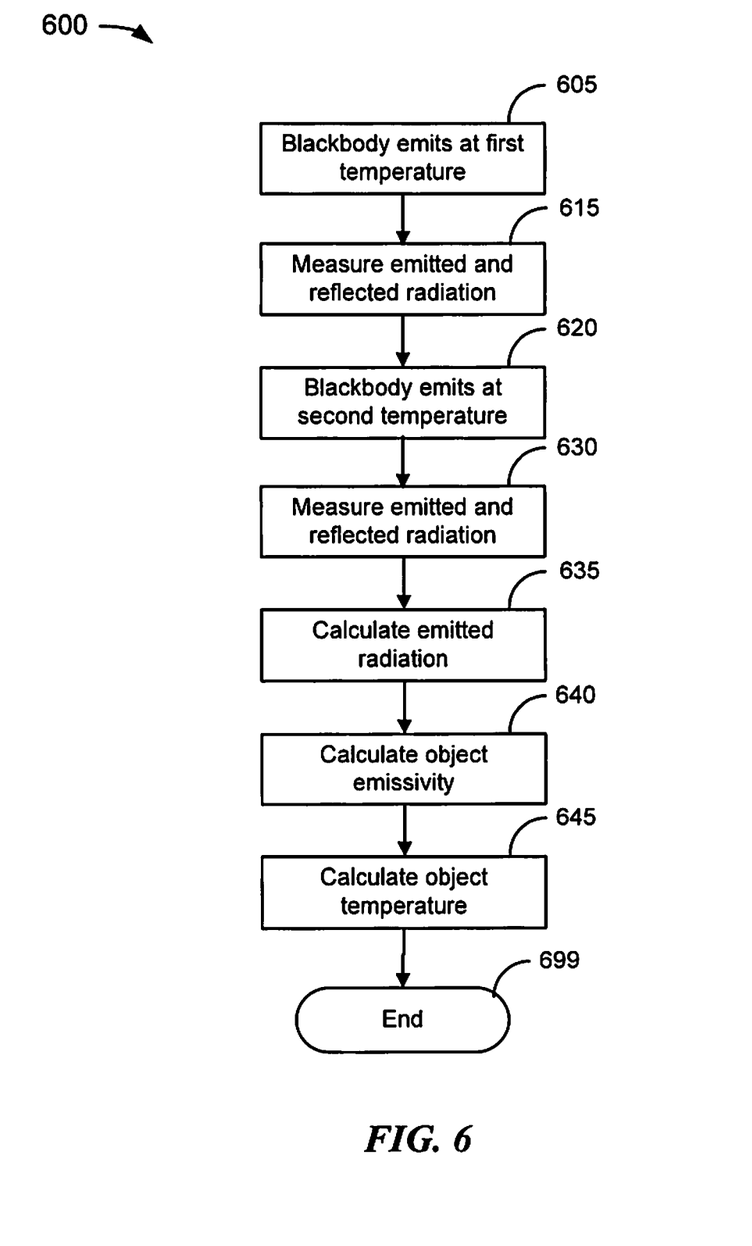
FIG. 6 depicts a flow diagram illustrating an exemplary process for measuring an object's temperature and emissivity, according to an embodiment of the disclosure.

FIG. 6 depicts a flow diagram illustrating an exemplary process for measuring an object's temperature and emissivity. At block 605, an emitter having nearly blackbody characteristics emits at a first temperature. Then at block 615, a detector measures the radiation, where the radiation is made up of the radiation emitted by the object to be measured and the radiation emitted by the emitter and then reflected by the object.

At block 620, the emitter emits at a second temperature. The second temperature can be either higher or lower than the first temperature.

Then at block 630, the detector measures the radiation emitted and reflected by the object again.

Using the first and second radiation measurements along with the known first and second temperature settings of the emitter and known radiation emitted by the emitter at the first and second temperatures, at block 635 the radiation emitted by the object can be calculated using equation (4).

Then at block 640, the emissivity of the object can be determined by using equation (5) if the emitter's emissivity is close to one. If the emissivity of the emitter is not approximately equal to one, an equation for emissivity of the object can be derived to take the emitter's emissivity into account.

By using the Planck's law and the emitted radiation and emissivity determined at blocks 635 and 640, the temperature of the object can be determined at block 645. The process ends at block 699.

Figure 7:
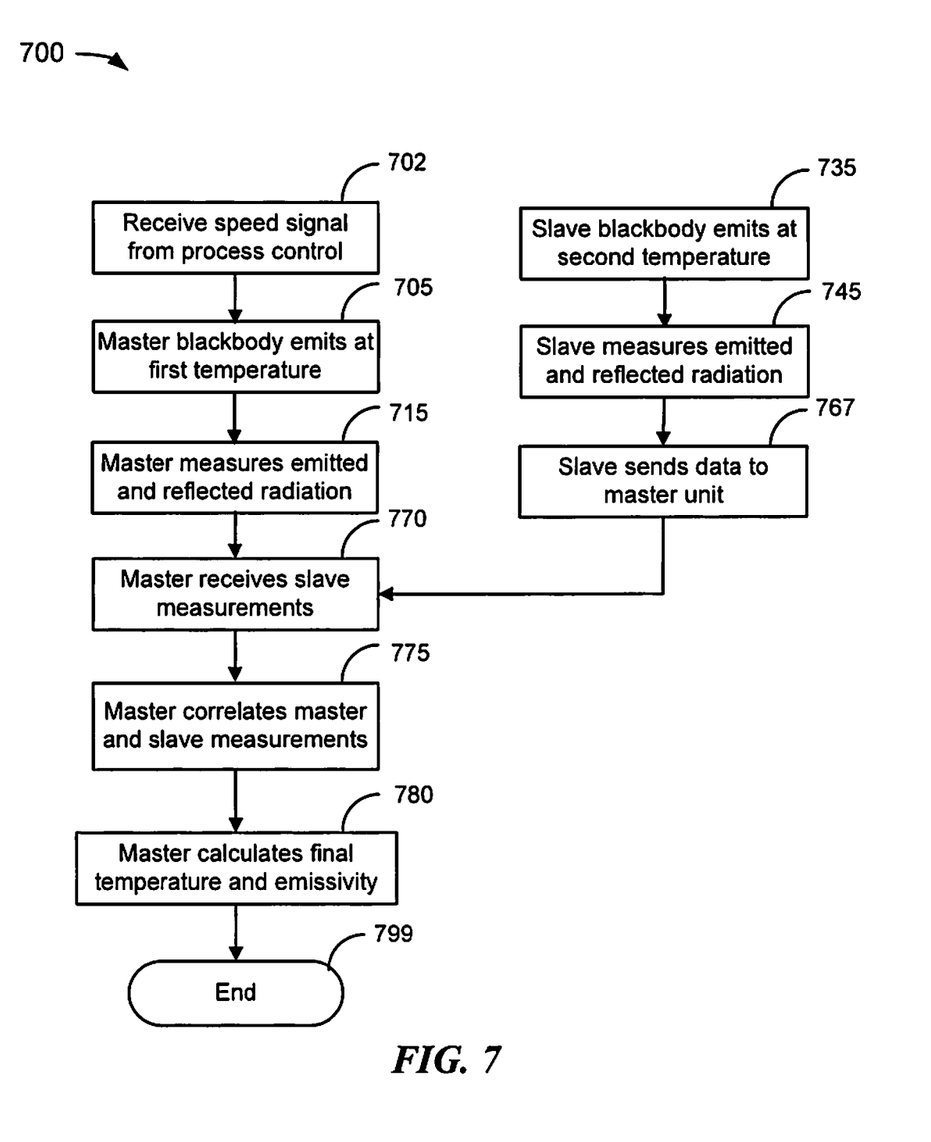
FIG. 7 depicts a flow diagram illustrating an exemplary process for measuring a moving object's temperature and emissivity, according to an embodiment of the disclosure.

FIG. 7 depicts a flow diagram illustrating an exemplary process for measuring a moving object's temperature and emissivity using a master unit and a slave unit, according to an embodiment of the disclosure.

At block 702, the master unit can optionally receive a speed signal from a process control unit that determines the speed that the object to be measured is moving. Then the master unit has a compact blackbody that emits at a first temperature at block 705, and radiation emitted and reflected from the moving object is measured at block 715. Similarly, the slave unit has a compact blackbody that emits at a second temperature at block 735, and radiation emitted and reflected from the moving object is measured at block 745. The first temperature at which the master emitter is set to emit is different from the second temperature at which the slave emitter is set to emit.

Then at block 767, the slave unit sends the measurements to the master unit. At block 770, the master receives the measurements.

At block 775, if the master unit received a speed signal from a process control unit at block 702, the master unit captures the master and slave measurements. If the master did not receive a speed signal, the master correlates the master and slave measurements. Each of the measurements taken by the master unit and the slave unit carries a time stamp, and the distance between the two units is known. Thus, if the speed of the object is constant and known, the relationship, speed× time=distance, can be used to correlate the measurements made by the master and slave units such that measurements of the same spot are used to calculate the temperature and emissivity of the moving object. At block 780 the master calculates the final temperature and emissivity of the object by using equations (4) and (5), and the process ends at block 799.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An apparatus, comprising:
   a source of infrared radiation integrated into the apparatus for emitting a first infrared radiation at a first temperature upon a first spot of an object and emitting a second infrared radiation at a second temperature upon a second spot of the object, wherein the first spot is different from the second spot, wherein the source of infrared radiation has blackbody characteristics;
   a processor configured to receive measurements of the infrared radiation reflected from the first spot and the second spot upon emission of the first and second infrared radiation upon the object, a first object emission radiation from the first spot, and a second object emission radiation from the second spot and to determine an emissivity of the object from the received measurements.

2. The apparatus of claim 1, wherein the processor is further configured to determine a temperature of the object based at least upon a known emissivity of source and the emissivity of the object.

3. A system comprising:
   a source of infrared radiation configured to sequentially emit a first radiation pulse at a first temperature at a first time and a second radiation pulse at a second temperature at a second time, wherein the first radiation and the second radiation are in an infrared range, the second time is different from the first time, the second temperature is different from the first temperature, and the source has an emitter emissivity, wherein the source of infrared radiation has blackbody characteristics;
   a first infrared lens configured to project the first radiation pulse onto a spot on an object to be measured and the second radiation pulse onto the spot on the object to be measured;
   a sensor configured to detect at a third time a reflection of the first radiation pulse from the spot and a first emission radiation emitted by the object from the spot at a third time and to detect at a fourth time a reflection of the second radiation pulse from the spot and a second emission radiation emitted by the object from the spot at a fourth time;
   a processor configured to determine an emissivity of the object based upon the detected radiation at the third and fourth time, the first radiation pulse, the first temperature, the second radiation pulse, the second temperature, and the emitter emissivity.

4. The system of claim 3 wherein the processor is further configured to determine a temperature of the object based upon the calculated emissivity of the object.

5. The system of claim 3, further comprising electronics configured to amplify and filter the detected radiation at the third and fourth time.

6. The system of claim 5, further comprising electronics configured to digitize the amplified and filtered electrical signals.

7. The system of claim 3 wherein the source has blackbody characteristics and stable or known optical properties.

8. The system of claim 3 wherein determining the emissivity of the object comprises using a look-up table.

9. The system of claim 3, wherein a time constant of the sensor is comparable to or faster than a time constant of the source of infrared radiation.

10. The system of claim 3, further comprising a second infrared lens configured to project the reflection of the first radiation pulse from the spot and the first emission radiation emitted by the object from the spot and the reflection of the second radiation pulse from the spot and the second emission radiation emitted by the object from the spot onto a field aperture of the sensor.

11. The system of claim 10 wherein the source, the first and second infrared lenses, and the sensor share an optical axis, and further wherein the optical axis is maintained by a housing.

12. The system of claim 11, further comprising a distance sensor configured to sense a distance between the housing of the system and the object.

13. The system of claim 12, further comprising a tilt mechanism configured to maintain substantially 90° between an optical axis of the system and a surface of the object, wherein the tilt mechanism is responsive to the distance.

14. The system of claim 10 wherein the first radiation pulse and the second radiation pulse emitted by the source travel through a hole in the first infrared lens to reach the second infrared lens.

15. The system of claim 10, further comprising a cooling unit configured to cool the source, the sensor, the first infrared lens, and the second infrared lens to shield the sensor from stray radiation.

16. A system, comprising:
means for emitting a first radiation at a first temperature at a first time and a second radiation at a second temperature at a second time, wherein the first radiation and the second radiation are in an infrared range, the second time is different from the first time, the second temperature is different from the first temperature, the first temperature and the second temperature are temperatures of the means for emitting, and the means for emitting has an emitter emissivity and is blackbody-like;
a first means for projecting the first radiation onto a spot on an object to be measured and the second radiation onto the spot on the object to be measured;
a second means for projecting a third radiation at a first time window, wherein the third radiation comprises reflection of the first radiation from the spot and a first emission radiation emitted by the object from the spot, and a fourth radiation at a second time window, wherein the fourth radiation comprises reflection of the second radiation from the spot and a second emission radiation emitted by the object from the spot onto a field aperture of a sensor, wherein the first emission radiation and the second emission radiation are at least in the infrared range, and further wherein the sensor is configured to convert the sensed third radiation into a first set of electrical signals and the sensed fourth radiation into a second set of electrical signals; and
means for determining an emissivity of the object and a temperature of the object from the first and second set of electrical signals.

17. A system, comprising:
a master unit having:
a master blackbody-like source configured to emit a first master radiation at a first master temperature, wherein the first master radiation is in an infrared range;
a first infrared lens configured to project the first master radiation onto an object to be measured, wherein the object is moving at a given speed, and further wherein the projected first master radiation is along a first trace on the moving object;
a second infrared lens configured to project the first master radiation reflected by the object and a second master radiation emitted by the object onto a master field aperture of a master sensor, wherein the second master radiation is at least in the infrared range, and further wherein the master sensor is configured to convert sensed infrared radiation to master electrical signals;
a master processor configured to convert the master electrical signals to a first radiation; and
a coupling unit configured to couple mechanically and electrically the master unit to a slave unit;
the slave unit having:
a slave blackbody-like source configured to emit a first slave radiation at a first slave temperature, wherein the first slave radiation is in the infrared range, and further wherein the first slave temperature is different from the first master temperature;
a third infrared lens configured to project the first slave radiation onto the moving object, wherein the projected first slave radiation is along a second trace on the moving object, wherein at least a portion of the second trace and at least a portion of the first trace cover the same area on the object;
a fourth infrared lens configured to project the first slave radiation reflected by the object and a second slave radiation emitted by the object onto a slave field aperture of a slave sensor, wherein the second slave radiation is at least in the infrared range, and further wherein the slave sensor is configured to convert sensed infrared radiation to slave electrical signals; and
a slave processor configured to convert slave electrical signals to a second radiation,
wherein the master processor is further configured to determine a final emissivity of the object based at least upon a correlation of the first radiation and the second radiation at the same location on the object.

18. The system of claim 17 wherein the master processor is further configured to receive a speed signal corresponding to the given speed from an object speed determination unit, the first trace and the second trace overlap, the master processor integrates the master electrical signals over the overlapping trace to obtain the first radiation, the slave processor integrates the slave electrical signals over the overlapping trace to obtain the second radiation, and wherein the master processor further uses the speed signal to determine a final temperature of the object.

19. A non-transitory computer-readable medium encoded with processing instructions for implementing a method, performed by a computer, the method comprising:
receiving a first set of electrical signals corresponding to measurements of a first emitted radiation from a spot on an object and a first reflected radiation from the spot, wherein the first reflected radiation originated from an infrared source emitting a first source radiation pulse at a first source temperature with a source emissivity, wherein the source has blackbody characteristics;

receiving a second set of electrical signals corresponding to measurements of a second emitted radiation from the spot and a second reflected radiation from the spot, wherein the second reflected radiation originated from the infrared source sequentially emitting a second source radiation pulse at a second source temperature, wherein the second source temperature is different from the first source temperature;

receiving data comprising the first source temperature, the first source radiation pulse, the second source temperature, the second source radiation pulse, and the source emissivity;

calculating an emissivity and a temperature of the object using the first and second sets of electrical signals and the received information;

storing the emissivity and the temperature in a memory.

20. The non-transitory computer-readable medium of claim 19 wherein the transmissivity of the object is substantially zero.

21. A method, comprising:

sensing by a sensor a first radiation comprising a first reflected radiation from a spot on an object and a first emitted radiation from the spot, wherein a blackbody-like source at a first known temperature with a known source emissivity emitted a first source radiation pulse that was reflected from the spot to become the first reflected radiation, and the first reflected radiation and the first emitted radiation are in an infrared range;

sensing by a sensor a second radiation comprising a second reflected radiation from the spot and a second emitted radiation from the spot, wherein the blackbody-like source at a second known temperature sequentially emitted a second source radiation pulse that was reflected from the spot to become the second reflected radiation, the second known temperature is different from the first known temperature, and the second reflected radiation and the second emitted radiation are in the infrared range;

receiving by a processor information comprising the first known temperature, the first source radiation pulse, the second known temperature, the second source radiation pulse, and the source emissivity;

calculating by the processor an emissivity and a temperature of the object based at least upon the first and second radiation, and the received information;

storing the emissivity and the temperature in a non-transitory memory.

* * * * *